G. W. STEWART.
PACKING.
APPLICATION FILED FEB. 24, 1920.
1,381,942.
Patented June 21, 1921.
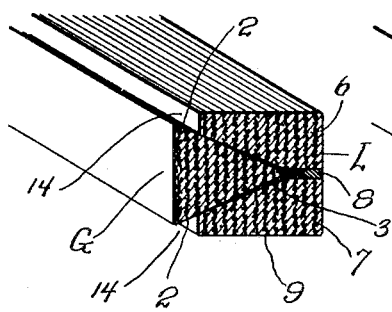
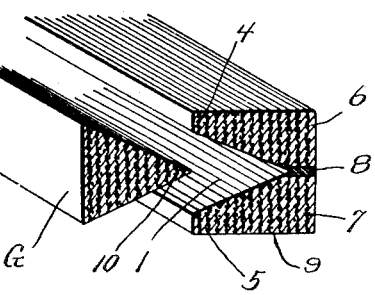
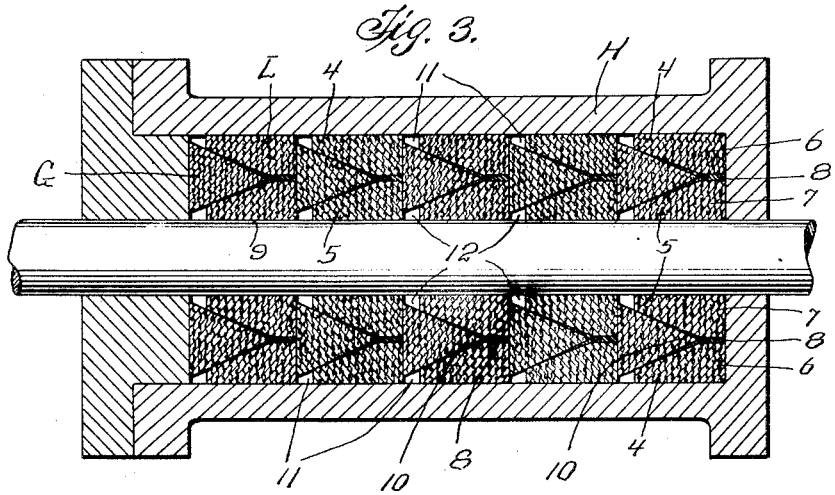
Inventor
George W. Stewart
By his Attorney

UNITED STATES PATENT OFFICE.

GEORGE W. STEWART, OF WEEHAWKEN, NEW JERSEY.

PACKING.

1,381,942.  Specification of Letters Patent.  Patented June 21, 1921.

Application filed February 24, 1920. Serial No. 360,604.

*To all whom it may concern:*

Be it known that I, GEORGE W. STEWART, residing at Weehawken, in the county of Hudson and State of New Jersey, have invented certain new and useful Improvements in Packings, of which the following is a specification.

This invention relates to a packing for piston rods, plungers, pistons, etc., and the object of the invention is to provide a packing which is simple in construction, and consequently cheap to manufacture, one which will be durable, and highly efficient for its purpose.

A further object is to provide a packing of such construction that it may be readily spread, or expanded, for tightening its fit against the piston or shaft.

A further object is to provide a packing which, when in position within a stuffing box or the like, will provide a plurality of annular open spaces about the piston or shaft for increasing the efficiency of the packing.

A further object is to provide a packing which will satisfactorily serve its purpose whether the packing be placed in the stuffing box in either one or two different positions relative to the direction of pressure.

A further object is to provide a packing due to the construction of which the expansive effects of moisture during use will not detrimentally increase the tightness of the packing upon the piston or shaft.

A further object is to provide a packing made up of a plurality of separately formed wedge operating parts all connected together as a single heterogeneous mass.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawings which are to be taken as a part of this specification, and in which I have shown merely a preferred form of embodiment of the invention:—

Figure 1 is a transverse sectional view partly in perspective of a packing constructed in accordance with this invention.

Fig. 2 is a similar view but showing the wedge element of the packing separated from the main body.

Fig. 3 is a transverse longitudinal sectional view through a stuffing box showing the packing of this invention positioned therein as in use, and Fig. 4 is a transverse sectional view illustrating a slightly modified form of construction of the packing.

Referring to the drawings for describing in detail the structure which is illustrated therein, the reference character L indicates the main body of the packing, while the reference character G indicates the wedge element. The body L is preferably of rectangular cross section substantially as illustrated, and has a V or wedge-shaped recess 1 therein, said recess being continuous longitudinally of the packing and being adapted to receive the wedge element G. The wedge element is made in such proportions that when in normal position within the recess its larger end projects out of the recess for a considerable distance, as indicated at 2 in Fig. 1.

Although the packing of this invention may be manufactured and sold if desired with the parts L and G disconnected from each other, yet it is preferable in most instances to have these two parts connected together. It is a feature of this invention, therefore, to provide a suitable bonding agent, as 3, for holding the parts L and G together at all times. This bonding agent may be of any appropriate character, but preferably consists of soft rubber, or other flexible cementitious material, of a character such that although it efficiently prevents disconnection of the parts, yet it permits a sufficient sliding movement of the parts relative to each other so that the wedge element G, if pressed toward the body, will cause the leg portions 4 and 5 of the body at opposite sides of the recess 1 to be spread apart to an extent depending upon the amount of pressure exerted upon the wedge element.

In order to increase the efficiency of this packing the body part L may be formed of two separate pieces, as 6 and 7, connected together by a soft rubber, or other suitable flexible or elastic cementitious material, as 8. By this means the action of the wedge in spreading the legs of the body may also be made to serve for spreading not only the legs of the body but for spreading the two halves 6 and 7 in substantially parallel planes away from each other, thus causing a broader expanse of the surface 9 for instance of the packing to wear tightly upon the shaft.

It has been found that an efficient result may be obtained by making the wedge slightly more obtuse in shape than the shape of the recess 1 so that thus the end portions of the legs 4 and 5 engage tightest against the wedge surface of the wedge. The binder 3, for holding the parts together, is therefore, of gradually increasing thickness from the ends of the legs 4 toward the apex of the wedge. In this way provision is made for an actual sliding movement of the wedge into the recess.

The binder 8 is also preferably made quite thick to facilitate the inward movement of the wedge and at the same time to facilitate the easy spreading apart of the halves 6 and 7 of the body.

Both the parts L and G may be made up of any appropriate material but each preferably consists of alternate layers of rubber and woven canvas or the like, the rubber being vulcanized directly to and about the canvas as is well known in this art. These layers are preferably arranged substantially parallel to the base of the wedge so as to stand vertical to the shaft and, therefore, transverse to the wedge. It is seen that in this way the shorter pieces of the canvas material, occurring at the apex of the wedge, as at 10, are received and held within the bottom of the recess 1 in the finished packing so that there is no likelihood of these parts peeling off at any time. The shorter pieces occurring at the ends of the legs 4 and 5 of the body have a particularly valuable function, as follows:—

When the packing is placed within a stuffing box, as H, in Fig. 3, a plurality of rings of the packing are arranged one against the other along the length of the shaft. In this position the projecting parts 2 of the several wedges engage against the bodies of the adjacent rings and thereby provide annular open spaces, as 11 and 12, encircling the shaft. These open spaces are, therefore, directly adjacent to the end portions of the legs 4 and 5.

During the use of the packing, as thus placed, in a steam engine, for instance, a certain quantity of moisture is absorbed by the fabric of the packing causing the packing to expand.

Unless suitable provision is made to compensate for it, this expansion frequently is so powerful as to injure or interrupt the operation of the machine. In the present packing, however, an absorption of moisture and a consequent expansion of the packing will simply cause the short pieces of canvas constituting the leg portions of the body to bend over appropriately into the spaces 11 and 12, thus relieving the pressure and preventing undue tightness of the packing and consequently preventing injury to the engine.

The binders 3 and 8 also may be depended upon to absorb a suitable portion of the expansion of the fabric to the same end.

The spaces 12 are also of considerable value for increasing the efficiency of the packing in preventing escape of pressure along the shaft.

In the use of this packing the spaces 12 gradually fill with water due to condensation so that a plurality of bands, or rings, of water are held in position surrounding the shaft at spaced points, thus providing a plurality of spaced water seals against any passage of steam along the shaft.

The layers of fabric are relatively stiff and inflexible and non-resilient as compared with the layers of rubber. Hence, by arranging the layers of fabric in a position so that they will stand transverse of the shaft, as indicated, the spreading action of the wedge will be quite positively applied for moving the edge portions of the fabric into engagement with the shaft. On the other hand, a considerable pressure may be applied against the packing in a direction longitudinally of the shaft to compress the packing and yet not to cause any appreciable pressure of the packing against the shaft except such pressure as is the direct result of sliding movement of the wedges into the several recesses.

In the modification Fig. 4, the packing is shown to be the same in all respects as the packing hereinabove described except that in this instance the canvas fabric is arranged in a substantially circular, or evolute, form within the body and wedge. The body is also shown as one piece; that is, without the binder 8, for resiliently connecting its top and bottom halves. This construction may be particularly advantageous as providing the leg portions 4 and 5 with a suitable degree of flexibility so that steam pressure entering above the leg 5, for instance, at the point 13, will cause said leg 5 to bend downwardly under the steam pressure against the shaft even though the wedge G be not tightly pressed into the recess of the body.

In this midification, as in the structure previously described, the wedge G projects beyond the body so as to provide in effect cut-away portions or recesses 14 at the corners of the packing, as viewed in transverse section, for forming the open spaces 11 and 12 in the stuffing box.

As many changes could be made in this construction without departing from the scope of the invention as defined in the following claims, it is intended that all matter contained in the above description, or shown in the accompanying drawings, shall be interpreted as illustrative only and not in a limiting sense.

Having thus described my invention, what I claim as new and desire to secure by Letters Patent is:—

1. A packing comprising a body rectangular in cross section and having a wedge shaped opening therein, a wedge element engaging within said wedge shaped opening, and means connecting said body and said wedge element together to form a single heterogeneous mass.

2. A packing comprising a body rectangular in cross section and having a wedge shaped opening therein, a wedge element engaging within said wedge shaped opening, and said wedge element being of a size to substantially fill said opening and to project outwardly therefrom and being adapted when forced into said opening to serve as a wedge for spreading the body, substantially as described.

3. A packing comprising a body rectangular in cross section and having a wedge shaped opening therein, a wedge element engaging within said wedge opening, said body comprising two independently movable parts one at each side of said wedge element, and said wedge element being adapted when forced into said opening to serve as a wedge for spreading said two parts of the body away from each other.

4. A packing comprising a body rectangular in cross section and having a wedge shaped opening therein, a wedge element engaging within said wedge shaped opening, said body comprising two independently movable parts one at each side of said wedge element, and means connecting said body parts and said wedge element together to constitute a single heterogeneous mass.

5. A packing comprising a body rectangular in cross section and having a wedge shaped opening therein, a wedge element engaging within said wedge shaped opening, said body comprising two independently movable parts one at each side of said wedge element, and a yielding cementitious material connecting said body parts and said wedge element together to constitute a single heterogeneous mass while yet permitting independent movement of each of said parts.

6. A packing comprising a body rectangular in cross section and having a wedge shaped opening therein, a wedge element engaging within said wedge shaped opening, and said wedge element being relatively more obtuse in shape than said opening, substantially as described.

7. A packing comprising a body rectangular in cross section and having a wedge shaped opening therein, a wedge element engaging within said wedge shaped opening, said wedge element being relatively more obtuse in shape than said opening, and a binder for filling the open space formed by the difference in contour of said wedge element and said opening and for connecting together said wedge element and said body.

8. A packing comprising a body rectangular in cross section and having a wedge shaped opening therein, a wedge element engaging within said wedge shaped opening, said wedge element being relatively more obtuse in shape than said opening, and a binder for filling the open space formed by the difference in contour of said wedge element and said opening and for connecting together said wedge element and said body, said binder being flexible to permit movement of said wedge element with respect to said body.

9. A packing comprising a body rectangular in cross section and having a wedge shaped opening therein, a wedge element engaging within said wedge shaped opening, said wedge element being relatively more obtuse in shape than said opening, a binder for filling the open space formed by the difference in contour of said wedge element and said opening and for connecting together said wedge element and said body, said binder being flexible to permit movement of said wedge element with respect to said body, said body being formed of two separate halves one disposed at each side of said mentioned opening, and a binder of resilient material connecting said halves together disposed beyond the apex of said wedge element.

10. A packing comprising a body rectangular in cross section and having a wedge shaped opening therein, a wedge element engaging within said wedge shaped opening, and both said body and said wedge element being made up of alternate layers of fabric and rubber, said layers being arranged substantially parallel with the base of said wedge element.

11. A packing comprising a body rectangular in cross section and having a wedge shaped opening therein providing spaced leg portions, a wedge element engaging within said wedge shaped opening, and said leg portions comprising alternate layers of fabric and rubber.

In testimony whereof I affix my signature in the presence of two witnesses.

GEORGE W. STEWART.

Witnesses:
L. GESSFORD HANDY,
MAY SCHULZ.